United States Patent [19]

Pierce

[11] 4,211,137
[45] Jul. 8, 1980

[54] APPARATUS FOR CUTTING STIFF SHEET MATERIAL

[76] Inventor: Donald C. Pierce, 1253 C Redwood Blvd., Novato, Calif. 94947

[21] Appl. No.: 7,007

[22] Filed: Jan. 29, 1979

[51] Int. Cl.$^2$ .......................... B26D 3/08; B26D 1/20
[52] U.S. Cl. ................................ 83/864; 83/471.2; 83/485; 83/614; 83/508
[58] Field of Search ................ 83/864, 865, 863, 862, 83/471.1, 471.2, 471.3, 485, 486, 487, 614, 508

[56] References Cited

U.S. PATENT DOCUMENTS

| | | | |
|---|---|---|---|
| 371,961 | 10/1887 | Mason | 83/508 X |
| 3,403,709 | 10/1968 | Retherford et al. | 83/471.2 |
| 3,706,251 | 12/1972 | Wheeler | 83/614 X |
| 3,762,249 | 10/1973 | Wheeler | 83/864 |

FOREIGN PATENT DOCUMENTS 437291  11/1926  Fed. Rep. of Germany ............. 83/864

*Primary Examiner*—J. M. Meister

*Attorney, Agent, or Firm*—Owen, Wickersham & Erickson

[57] ABSTRACT

Apparatus for cutting stiff sheet material. A straight-edge barrier aligns the material. A back supporting the material includes a first bar perpendicular to the straightedge barrier. Along one edge of the first bar is a straight strip blade having a shearing face and a cutting edge making an acute angle with the shearing face, preferably of about 15°. On a second bar, spaced from and parallel to the first bar, is a carriage in rolling engagement with the second bar and carrying a series of rotatably supported shearing rollers, preferably at least four. The rollers are substantially coplanar, the axes for the first three lie along a line inclined to the blade and getting successively closer thereto, and are frustoconical at an inclination of about 6°. The fourth roller is mounted somewhat closer than it would be if its axis lay along that line and is the only roller which extends beyond the cutting edge into engagement with the shearing face of the blade, being spring-urged thereagainst. The first roller urges the sheet material against the cutting edge, and the succeeding rollers force the shearing action.

23 Claims, 9 Drawing Figures

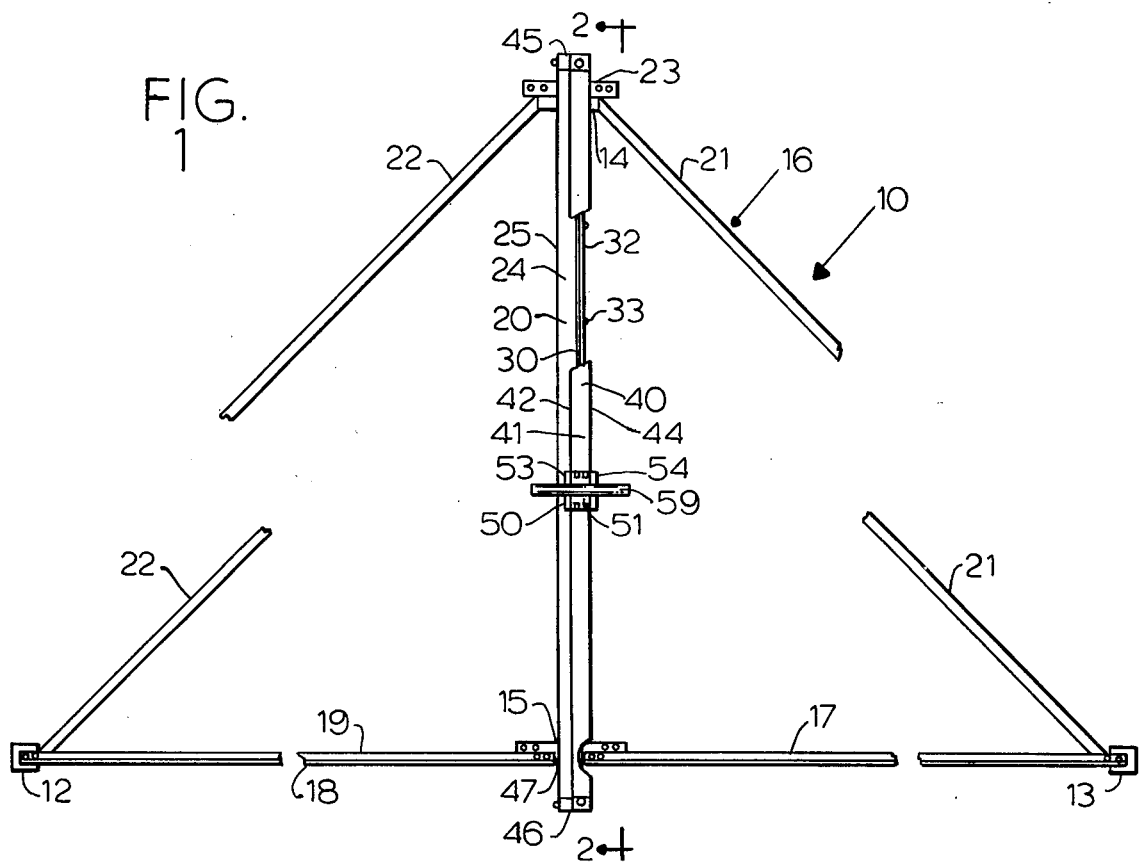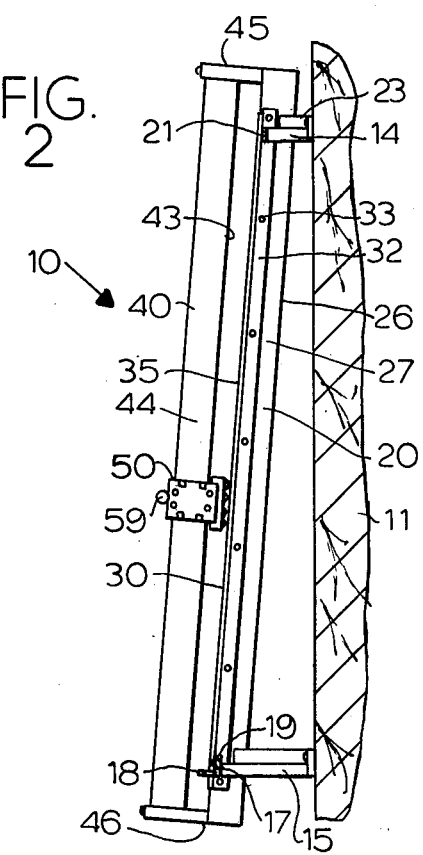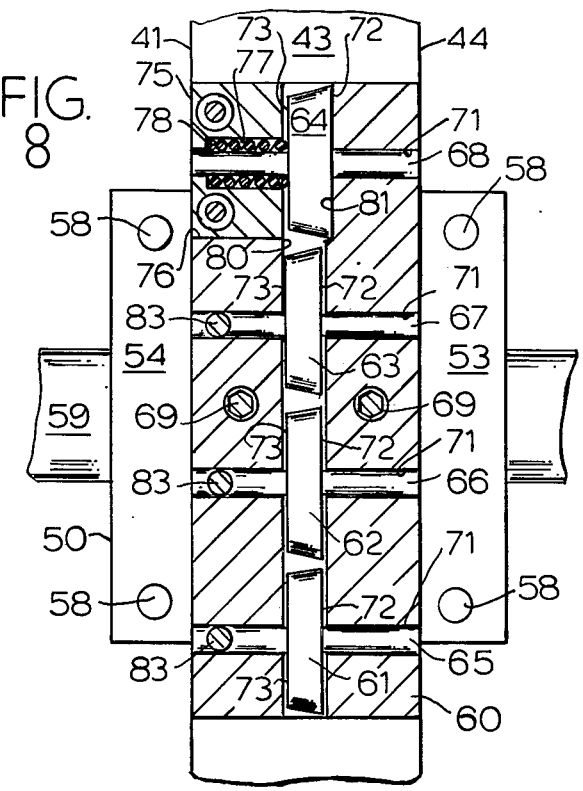

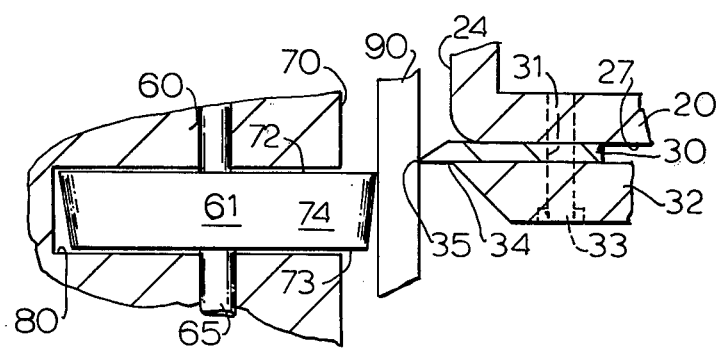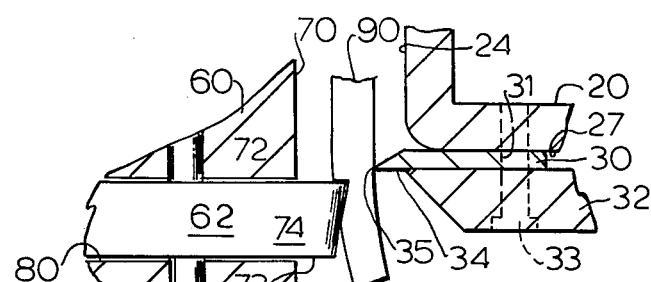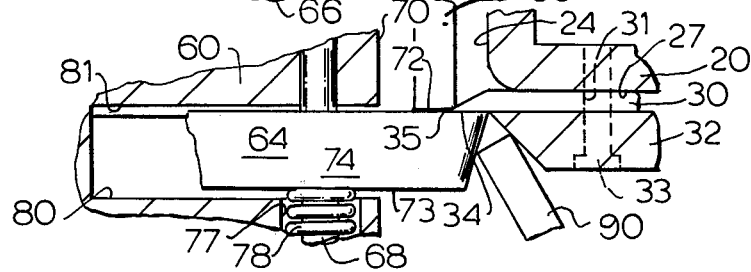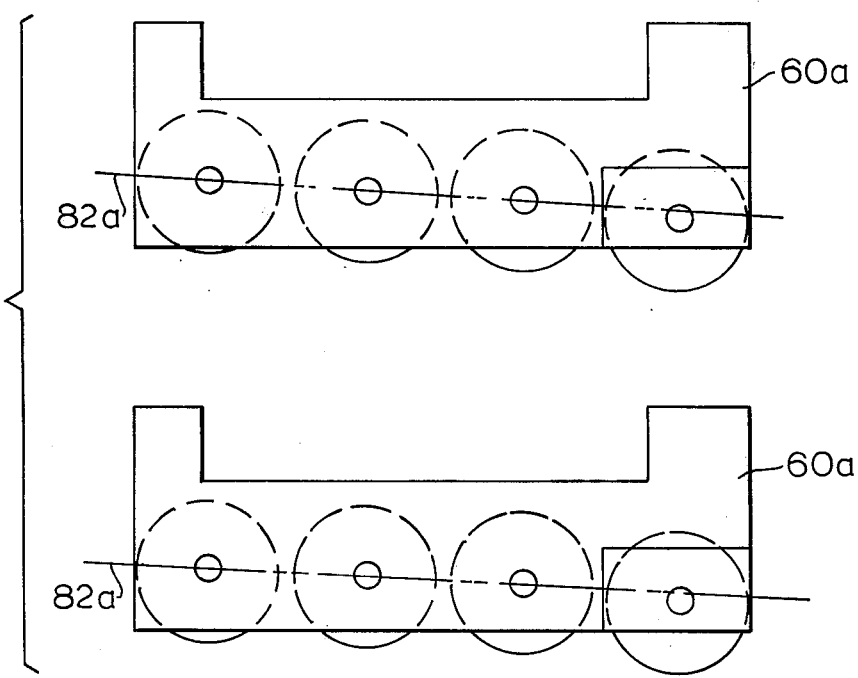

APPARATUS FOR CUTTING STIFF SHEET MATERIAL

BACKGROUND OF THE INVENTION

The invention relates to apparatus for cutting stiff sheet materials, such as hardboard and paperboard. It can be used to cut other material, including thin, light sheet metal, such as shim stock, if desired.

When sheets of hardboard or mounting board are to be cut, it is important that they be cut truly and straight, at 90° to the surface, and that the cut not deviate from a straight line. It is also important for the cutting to be done without having to exert great physical force.

Cutting devices of the type known as paper cutters that have a hinged blade, tend to deviate from a straight line, especially with very large sheets. They are very expensive for large sheets and tend to be very difficult to operate. They are quite unsatisfactory for use with hardboard, because they require too much force to be supplied by the operator.

Cutters having a single disc blade are normally unable to cut thick or hard sheets of material satisfactorily and tend to produce a non-linear edge as well as not to provide a straight cut through. The blade is usually somewhat cocked to the angle of the cut and achieves a straight cut-through for only one or so thicknesses.

Shearing apparatus such as are shown by the Wheeler et al, U.S. Pat. No. 3,706,251, involves the use of motors to cut sheet metal. They would be difficult to operate manually. Even then, the results would not be satisfactory with materials such as cardboard, mounting board, and hardboard. That device relies on a series of rapid passes in which the assembly of cutting rollers is brought closer and closer to the opposite side of the material being cut. This action tends to crush and damage mounting board.

A device using a plurality of rollers which are successively closer is also shown in German Pat. No. 437,291 (1926). This rather inflexible device has a blunt anvil against which it moves, a piece of metal having an engaging angle at 90°, an angle which I have found to give generally unsatisfactory results.

Neither of the devices just mentioned makes it easy to replace the rollers or to replace one series of rollers with another series for operation on thicker or thinner material.

Moreover, there has been no good cutter for material lying in between paper and metal. The small paper cutters cannot cut hardboard or even do well for large sheets of cardboard, while the heavy plant cutters for metal are both too expensive for and unsuited to cutting the cardboard and hardboard.

An important object of the present invention is to provide a cutting device for obtaining true linear cuts that cut straight through mounting board, cardboard, hardboard, and the like.

Another object of the invention is to provide a system that can easily be operated by hand, requiring comparatively little strength for cutting rather thick mounting board and hardboard.

Another object is to provide a small, wall-mounted progressive cutting device that can be hand operated, much less expensive than heavy-duty metal cutters, and comparable in expense with good paper cutters.

Another object is to provide a cutting device also suitable for leather, plastic, and other stiff materials having a rather soft or yielding surface. The device can also be used for cutting light sheet metal, if desired.

Another object of the invention is to provide a cutting device in which the blades and rollers are readily replaceable.

SUMMARY OF THE INVENTION

A device embodying the invention can be mounted either horizontally or generally vertically, although preferably it is mounted generally vertically at a slight inclination; thus it may be secured to a wall or to a rigid vertical or horizontal frame or to a table. In its vertical form it has a horizontal ledge for supporting and aligning the sheet material and a generally vertical, slightly rearwardly inclined back for support of that material. When used horizontally, there is still provided some sort of straightedge and some sort of back support.

The support back has a first bar that is perpendicular to the ledge and comprises part of the support. Along one edge of this is secured a strip blade which also is perpendicular to the ledge or straightedge. This blade has a generally vertical shearing face with a cutting edge that is preferably inclined from the plane perpendicular to the vertical face at about 15° or within the range of about 6° to 30°, so that the edge makes an acute angle of about 60° to 84° with the vertical shearing face.

A second bar is spaced from and is parallel to and offset from the first bar, and on this second bar is a movable carriage. The carriage is mounted to be in low-friction rolling engagement with the second bar for movement along a straight, generally vertical path, as by a series of rollers bearing against each face of the second bar. There may be two or more series of these rollers to assure perfect alignment.

The carriage itself may support a series of shearing rollers, or there may be a separate, readily removably secured block. The block is better because it enables one to change from one set of rollers to another very simply. The shearing rollers themselves are rotatably supported to face the cutting edge of the blade but to lie to one side thereof. There is a first (in the vertical form, the lowermost) roller which acts to nip the sheet material into firm contact with the cutting edge of the strip blade. This first roller may even initiate cutting, but the engagement and grasping are the important functions, and preferably this first roller by itself does not do any shearing. The successive rollers approach closer and closer to the blade and cut into the sheet material for successively greater depths. The final roller (the uppermost in the vertical system) overlaps the strip blade and completes the cut. These successive rollers cut into the material a little depth at a time, an additional amount for each roller, and the last one results in complete shearing. The rollers are preferably identical to each other and are provided with a vertical shear face and a sharp edge having a frustoconical surface inclined at about 6° from cylindrical or between 4° and 8°, the side away from the vertical shear face being smaller than the one meeting it. The axes of all rollers but the last lie along an inclined plane approaching the blade, while the last one is displaced inwardly a slight distance from a continuation of that plane. Moreover, this final roller is urged by a spring toward and actually against the shearing face of the strip blade, so that it could be considered a rotary cutter.

Other features, advantages, and objects of the invention will become apparent from the following description of a preferred embodiment thereof.

BRIEF DESCRIPTION OF THE DRAWINGS

In the drawings:

FIG. 1 is a view in front elevation of a cutting device embodying the principles of the invention. Parts have been broken in order to conserve space or to show parts otherwise obscured.

FIG. 2 is a view in side elevation of the cutting device of FIG. 1, shown supported on a wall, a fragment only of the wall being shown.

FIG. 4 is a view in section taken along the line 4—4 in FIG. 3 through the first or lowermost shearing roller, to show the nipping of the cardboard sheet between the roller and the strip blade.

FIG. 5 is a similar view in section taken along the line 5—5, through the second roller, showing the initiation of shearing.

FIG. 6 is a similar view in section taken along the line 6—6 in FIG. 3 through the last or uppermost roller, the shear being thereby completed.

FIG. 8 is a view in section taken along the line 8—8 in FIG. 3.

FIG. 9 is a view showing two removable roller-holding blocks with different angles of inclination of the axes of the roller to the strip blade.

DESCRIPTION OF A PREFERRED EMBODIMENT

Figure 3:
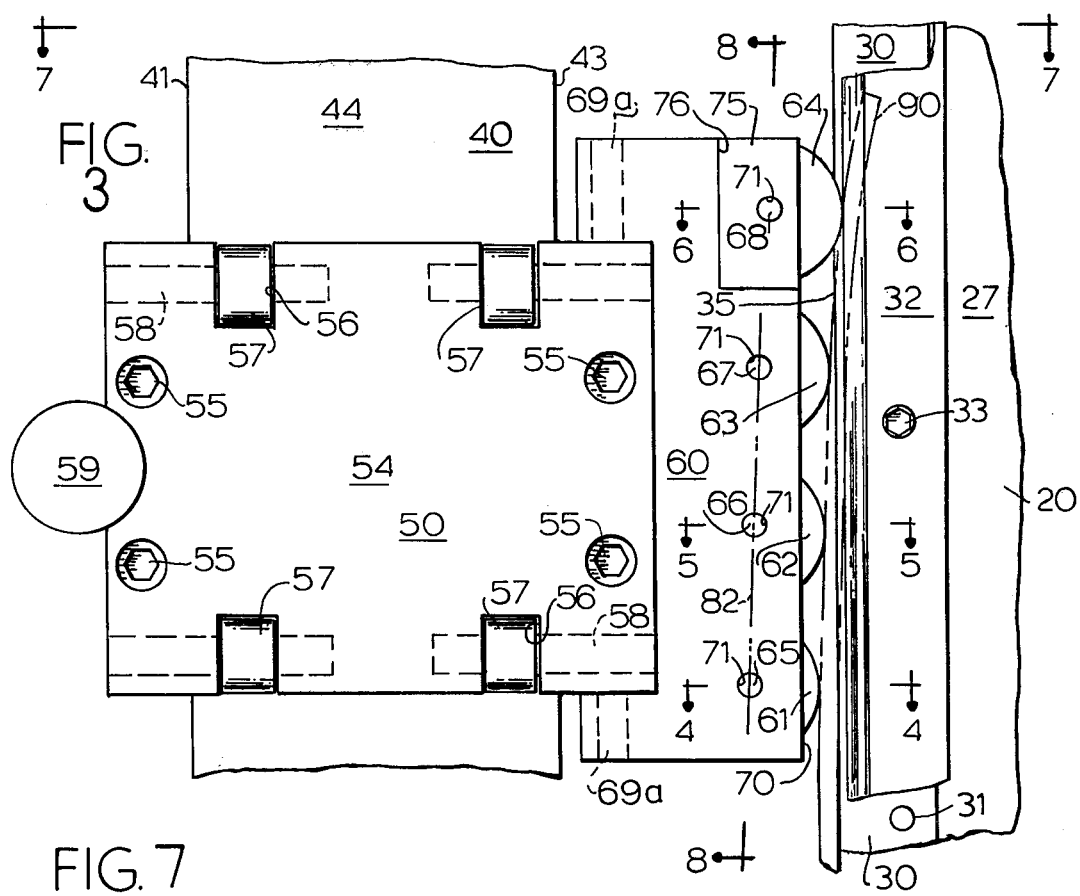
FIG. 3 is a fragmentary view in side elevation of the two parallel bars, the carriage with its shearing rollers and the cutting strip blade. A piece of cardboard is shown being sheared between the rollers and the strip blade, and a portion of the lower strip over the blade is broken away to show the blade there.
Figure 7:
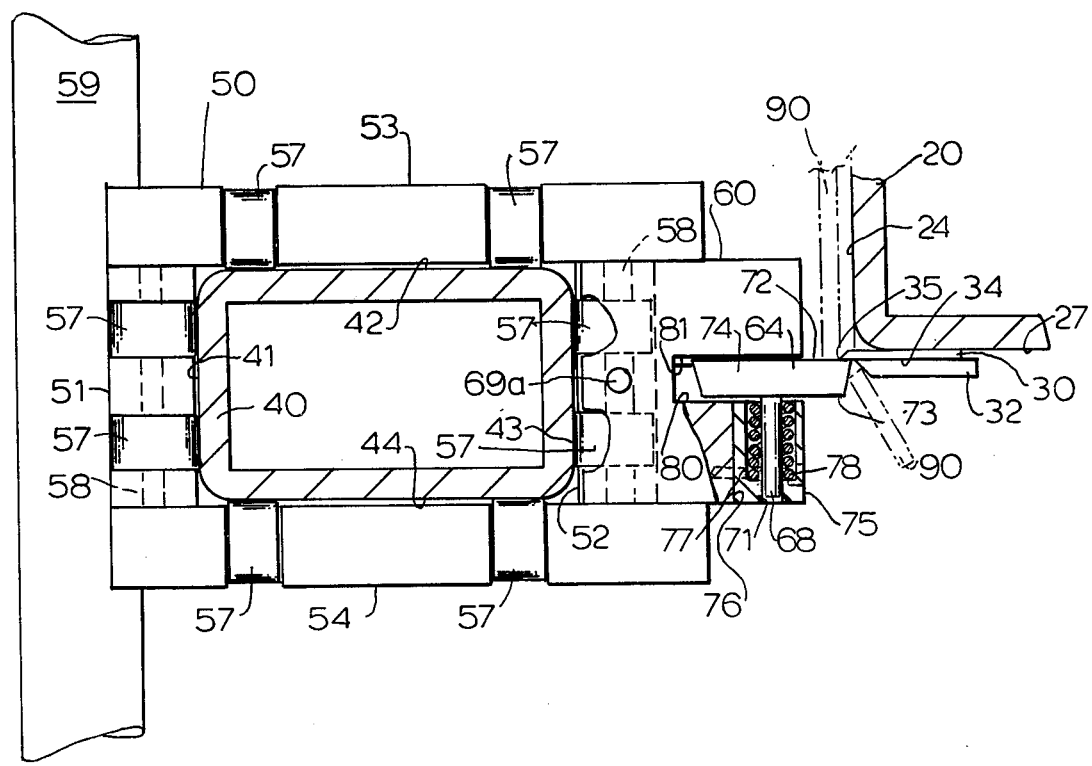
FIG. 7 is a view in section taken along the line 7—7 in FIG. 6.

Looking first at FIGS. 1 and 2, a preferred form of cutting device 10 embodying the principles of the invention is shown. The device 10 is mounted generally vertically with a slight backward inclination; it may, of course, be mounted horizontally if desired or in some other manner. In this instance, the cutting device 10 of the invention is shown secured to a structural wall 11 of a building. For this purpose, a series of securing brackets 12, 13, 14, and 15, are shown. A rigid frame could be used instead of the wall 11.

The apparatus 10 comprises a frame 16 which is generally triangular in shape with a base member 17 providing a ledge 18 which is horizontal for support of the sheet material to be cut. This member 17 may be an angle iron, for example, with a vertical face 19. The ledge 18 also acts as a straightedge barrier for alignment of the sheet material. The brackets 12 and 13 lie at opposite ends of this angle iron 17 and are secured to the wall 11. The frame 16 also includes a first bar 20 which extends perpendicularly to the ledge 18 and two end members 21 and 22, all of which converge at an apex 23 where the bracket 14 secures it to the wall 11. The outer extremities of the members 21 and 22 are adjustably secured to the base member 17 (by a slot-and-bolt arrangement) so that the trueness of the ledge 18 may be obtained in relation to the first bar 20. Near the bottom of the first bar 20, the bracket 15 secures it and the center of the base member 17 to the wall 11. The two angularly-extending end members 21 and 22 need not be identical or at identical angles, though they may be.

The first bar 20 is preferably substantially rectangular in cross section, though it may have rounded corners for safety and smoothness. Thus, it has four faces 24, 25, 26, and 27, all of which extend perpendicularly to the bottom ledge 18. Along one face 27 is secured a strip blade 30 for shearing. The blade 30 may be about one inch wide, about one-sixteenth inch thick, and its length may vary; for example, it may be 54 inches long or 30 inches long, or some other size. It should project about 1/16" beyond the face 24 of the first bar 20. This blade 30 is provided with a series of punched holes 31 therethrough and an outer cover strip 32 is placed against it and used to tighten it against the face 27 of the first bar 20 by a series of bolts 33 which may be provided with Allen heads, as shown in FIG. 3. The blade 30 has a generally vertical shearing face 34 and a cutting edge 35 which lies at an acute angle to the shearing face 34, the difference between the angle it makes and the perpendicular being about 15°, or at least lying within the range of about 6° to about 30°. Thus, it makes an angle of about 75° or between 60° and 84° with the shearing face 34. The blade 30 is made to provide the needed hardness and is carefully installed so that it too will be truly perpendicular to the straightedge surface 18 of the base 17, with the edge 35 projecting about 1/16" beyond the surface 24 of the first bar 20.

A second bar 40 is spaced away from the first bar 20 and secured rigidly to it so that it will be truly parallel to, though offset laterally from, the first bar 20, and will therefore itself lie perpendicular to the plane of the supporting base 17 or straightedge 18. It may be identical to the first bar having four faces 41, 42, 43, and 44, and may parallel the first bar 20 for its full length, being secured to it at the top 45 and bottom 46. It will be noted that the bars 20 and 40 extend well below the ledge 18, for enabling cutting action right down to the ledge 18. For the same reason, the generally vertical face 19 is slit at 47 so that the strip blade 31 can cut all the way down to the ledge 18.

A carriage 50 is mounted for linear low-friction rolling on the second bar 40. This carriage 50 may be provided basically by four members, a front member 51, a rear member 52, and two side members 53 and 54, all held together by suitable bolts 55. The carriage 50 may include a series of recesses 56 along its edges to enable the insertion of a series of bar-engaging rollers 57 and their shafts 58, about which the rollers 57 are freely rotatable. Preferably, there are sixteen such rollers 57, two for every face at the upper end and two for every face at the lower end of the carriage 50. Thus, perfect alignment is secured, and the rollers 57 and the carriage 50 are sized so that while there is low-friction movement, there is adequate rigidity relative to the second bar 40 to secure the needed alignment and the needed rectilinear movement.

A handle 59 is secured to the carriage 50 to enable easy manual operation. Power may be used, if desired, as by a motor device, but is ordinarily unnecessary and so undesirable.

The carriage 50 may be used to support directly the shearing rollers, but preferably these may be mounted in a separate block 60, as illustrated. This block 60 is provided with a suitable recess to receive the shearing rollers and their shafts. Preferably, there are at least four such rollers 61, 62, 63, 64, each on a separate shaft 65, 66, 67, 68, all of which are used in the shearing operation. The block 60 itself is preferably made for easy dismounting from and remounting to the carriage 50. This may be done by securing the block 60 to the carriage 50 with two screws 69, though studs or other aligning means may be used. In addition, stability may be aided by a pair of set screws 69a bearing against the carriage.

The block 60 is made so that it will lie in perfect alignment with and parallel to the edge 35 of the blade 30. Its inner edge 70 faces the blade. Each block 60 is provided with a series of journal openings 71 in which the shafts 65, 66, 67, and 68 for the rollers 61, 62, 63, and 64 are mounted.

The rollers 61, 62, 63, and 64 may be identical to each other, provided with straight side walls 72 and 73 and a conical outer surface 74 rather than a cylindrical one, preferably making an angle of 6° or between 4° and 8°. The rollers 61, 62, 63, and 64 are mounted so that the larger side wall 72 lies closest to the cutting edge 35. The block 60 may be provided with a small additional piece 75 fitting into a recess 76 of that block 60 and provided itself with a recess 77 which is in line with the shaft 68 for the final roller 64. A spring 78 is mounted in this recess 77 around the shaft 68 and is used to urge the final roller 64 against the shearing face 34 of the blade 30. The other rollers 61, 62, and 63 never contact the blade 30. In addition, there may also be a slight lateral spacing away from the blade 30. A roller-receiving recess 80 (FIG. 8) provides a receptacle to hold the rollers, and the recess for the final roller 64 is offset at 81 to provide the correct location for that roller 64 toward which the spring 78 urges it. The first three rollers 61, 62, 63, when there are four, and in any event, all of them except the last roller 64, are provided so that their axes (or shafts) lie along a common plane 82 inclined to the blade edge 35, as shown in FIG. 9 especially, with the successive rollers coming closer and closer to the cutting edge 35 of the blade 30. The last roller 64 is inwardly offset from the continuation of the plane 82. As shown in FIG. 9, the block 60 may be replaced by a block 60a or a block 60b for cutting thicker materials and therefore having a sharper plane 82a or 82b of inclination, but the final roller is still offset inwardly from that plane 82a. This secures the shearing overlap of the roller 64 with the blade 30 along the face 34. Different blocks are used to accommodate significant differences in the thicknesses of sheet material, the block 60b being used for material thicker than that for which the block 60 is designed, and the block 60a for still thicker material, and so on.

The shafts 65, 66, 67, and 68 may be retained merely by set screws 83 to enable quick individual replacement of any shearing roller 61, 62, or 63, and the removability of the piece 75 enables replacement of the roller 64. The bolts 33 enable ready replacement of the strip blade 30.

FIGS. 4, 5, and 6 illustrate how the shearing action is exerted, as does FIG. 3. As shown in FIG. 4, the first roller 61 is used to nip the sheet material 90 firmly against the sharp edge 35 of the blade 30, thereby securing alignment of the sheet material 90 relative to the blade. The second roller 62, as shown in FIG. 5, then begins the shearing, since it is located too close to the edge 35 for the material 90 to withstand the ingress of that roller 62. Further shearing takes place by the successive roller 63 (or rollers, for more than four rollers can be used, if desired, especially for quite thick material). As FIG. 6 shows, the final roller 64 completes the shearing, since its face 72 partially overlaps and rests against the face 34 of the blade 30.

The progressive shearing makes it easy to operate the device by hand to cut cardboard (including mounting board) and hardboard, as well as sheets of plastic that are not too brittle.

It should be made clear that the combination of the strip blade 30 with the single roller 64 could cut the material 90, but it would take a lot of force, and alignment would be difficult. The combination of four rollers 61, 62, 63, and 64 makes it possible for the first roller 61 to specialize in forcing the material 90 onto the edge 35, and the edge 35 holds it firmly, indenting into it, as it would not do well if it were flat, instead about 15° off flat. The concentration of faces at the sharp edge 35 and the sharp edges of the roller 60 helps in grasping the material 90 firmly with perfect alignment, and the edge 35 bites into and slightly penetrates the material 90.

The second roller 62 is arranged to cooperate with the edge 35 to cut about one-third of the way through the material 90; the third roller 63 helps achieve a cut about two-thirds of the way through; then the final roller 64 not only cuts the remaining material but—being pressed against the wall 34—achieves a very sharp cut, leaving no fuzzy or ragged edge, but a very clean sharp edge. The inclinations of the rollers at about 6° assure parting of the part being cut from the material 90 it is being cut from. Too dull a roller (flat) achieves only crushing, no sharp cut or parting; and too sharp an edge achieves no parting. The set of rollers should achieve the nipping, progressive shearing, and final clean shear, and that is why different sets of rollers are used for significantly different thicknesses of sheet material.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A device for cutting stiff sheet material, including in combination:

a straightedge barrier for alignment of said sheet material, a back support for said sheet material, said back support including a first bar perpendicular to said straight-edge barrier, a strip blade secured along one edge of said first bar perpendicular to said straightedge barrier and having a shearing face with an acute-angle cutting edge projecting beyond said first bar, a second bar spaced from and parallel to said first bar, and a carriage mounted on said second bar in low-friction rolling engagement with said second bar, for movement therealong, said carriage having mounted thereon a series of rotatably supported shearing rollers opposite said cutting edge of said blade and to one side thereof, said rollers comprising a first roller, at least one intermediate roller and a last roller, all said rollers being substantially coplanar, all said rollers being identical and having a vertical shear face and a sharp edge, the axes of said rollers being successively closer to said cutting edge of said blade, so that during movement of the carriage, the first roller urges the sheet material against said cutting edge and seizes it there, the succeeding rollers forcing the material into progressive shearing action against said cutting edge and said shearing face, said rollers never passing beyond said cutting edge except for said last roller which extends beyond said cutting edge.

2. The device of claim 1 having spring means urging said last roller toward and against said shearing face of said strip blade.

3. The device of claim 1 having a handle for said carriage for manual operation.

4. The device of claim 1 wherein said carriage includes a readily removable block secured thereto and carrying said rollers.

5. The device of claim 1 wherein said strip blade has a thin face meeting said shearing face at said cutting edge and inclined to the perpendicular to said shearing face at about 6° to 30° in the direction toward the opposite edge of said blade.

6. The device of claim 1 wherein said each roller has a frustoconical roller surface inclined at an angle of about 4° to about 8°.

7. The device of claim 1 wherein the rotational axis of said last roller is displaced toward said strip blade from the extension of a plane joining the axes of said first and intermediate rollers.

8. The device of claim 1 wherein said second bar is essentially rectangular in cross section and said carriage incorporates a series of second rollers bearing on each face of said bar so as to achieve said low-friction rolling engagement therewith and to insure true alignment therewith and therefore with said blade.

9. The device of claim 1 wherein each said roller is readily separably removable for easy replacement thereof.

10. The device of claim 1 wherein there are at least four said rollers.

11. A device for cutting stiff sheet material, such as hardboard and paperboard, including in combination:
a horizontal ledge for support and alignment of said sheet material,
a generally vertical back for support of said sheet material, inclined slightly backwardly, and having a first vertical bar perpendicular to said ledge,
a strip blade secured along one edge of said first bar perpendicular to said ledge and having a generally vertical shearing face projecting a short distance beyond said first bar,
a second generally vertical bar forward of and parallel to said first bar,
a carriage mounted on and in low-friction rolling engagement with said second bar, for movement up and down therealong, and
a series of rotatably supported rollers mounted on said carriage opposite said cutting edge of said blade and to one side thereof, said rollers comprising a lowermost roller, at least one intermediate roller thereabove, and an uppermost roller, said rollers being aligned to be substantially coplanar, said rollers each having a vertical shear face and a sharp edge,
the axis of said rollers being successively closer to said cutting edge of said blade, so that during movement of the carriage, the lowermost roller urges the sheet material against said cutting edge and the succeeding rollers forcing the material into shearing relation with said cutting edge, said uppermost roller being the only roller with a sharp edge which extends beyond said cutting edge.

12. The device of claim 11 having spring means urging said uppermost roller toward and against said shearing face of said strip blade.

13. The device of claim 11 wherein said carriage includes a handle for manual operation.

14. The device of claim 11 wherein:
said strip blade is provided with said cutting edge by a thin face meeting said vertical face at said cutting edge at an angle between 60° and 84° and
said uppermost roller has a frustoconical surface inclined at an angle of about 4° to 8° tapering smaller away from the vertical shear face.

15. The device of claim 11 wherein said angle for the strip blade is approximately 75° and that for said roller approximately 6°.

16. The device of claim 11 wherein the rotational axis of said uppermost roller is displaced toward said strip blade from an extension of a plane joining the axes of said lowermost and intermediate rollers.

17. The device of claim 16 wherein there are four said rollers, the axes of all but the uppermost lying along said line.

18. The device of claim 11 wherein said second bar has four faces and said carriage incorporates a second series of rollers, each of which bears on one face of said bar so as to achieve said low-friction rolling engagement therewith and to maintain accurate alignment therewith.

19. The device of claim 11 wherein there are sixteen rollers in said second series, two for each face for each end of said carriage.

20. A device for cutting stiff sheet material, such as hardboard and paperboard, including in combination:
an horizontal ledge for support and alignment of said sheet material,
a generally vertical back for support of said sheet material, inclined slightly backwardly, and having a first vertical bar perpendicular to said ledge,
a strip blade secured along one edge of said first bar perpendicular to said ledge and having a shearing face with a cutting edge extending a short distance beyond said first bar and inclined from the plane perpendicular to said vertical face at about 6° to about 30°,
a second vertical bar forward of and parallel to said first bar,
a carriage mounted on and in low-friction rolling engagement with said second bar, for movement up and down therealong,
a block readily removably secured to said carriage having mounted therein a series of at least four rotatably supported rollers opposite said cutting edge of said blade and to one side thereof, said rollers comprising a lowermost roller, at least two intermediate rollers thereabove, and an uppermost roller, all said rollers being substantially coplanar, said rollers each having a vertical shear face and a sharp edge with a frustoconical surface inclined at about 4° to about 8° from cylindrical, all said rollers being identical, the axes of said rollers being successively closer to said cutting edge of said blade, so that during movement of the carriage, the lowermost roller urges the sheet material snugly against said cutting edge, the succeeding rollers forcing the material into shearing relation with said cutting edge for regular fractions of the cut, said rollers never passing beyond said cutting edge except for said uppermost roller which extends beyond said cutting edge, and
spring means urging said uppermost roller toward and against said vertical face of said strip blade.

21. The device of claim 20 wherein said blade angle is about 15° and the roller surface inclination about 6°.

22. The device of claim 20 wherein said lowermost roller and said intermediate rollers have their axes lying along a plane inclined to said cutting edge and said uppermost roller has its axis displaced toward said cutting edge from an extension of said line.

23. The device of claim 20 wherein said second bar has four faces and said carriage has its low-friction engagement therewith provided, along with accurate alignment therewith, by two series of rollers, one at an upper end of the carriage and one at the lower edge thereof, each series comprising at least one roller in engagement with each face of said bar.

* * * * *